United States Patent [19]

Glanzmann

[11] Patent Number: 5,138,972
[45] Date of Patent: Aug. 18, 1992

[54] APPARATUS FOR CONVEYING AND COATING CYLINDRICAL ARTICLES

[75] Inventor: Kurt Glanzmann, Ruti, Switzerland

[73] Assignee: Prazisions-Werkzeuge AG, Ruti, Switzerland

[21] Appl. No.: 587,651

[22] Filed: Sep. 26, 1990

Related U.S. Application Data

[63] Continuation-in-part of Ser. No. 308,330, Feb. 9, 1989, abandoned.

[51] Int. Cl.⁵ .................. B05B 13/06; B65G 37/00
[52] U.S. Cl. .................... 118/699; 118/308; 118/312; 118/318; 118/322; 118/326; 118/602; 198/623; 198/626.5
[58] Field of Search ............. 118/306, 309, 317, 318, 118/320, 322, 324, 326, 699, 602, 308, 312; 198/622, 623, 626.1, 626.3, 626.5, 626.6

[56] References Cited

U.S. PATENT DOCUMENTS

| | | | |
|---|---|---|---|
| 3,291,631 | 12/1966 | Smith | 427/195 |
| 3,310,431 | 12/1962 | Loose | 118/322 |
| 3,521,598 | 6/1968 | Straw | 118/318 |
| 3,901,381 | 8/1975 | Quinn | 198/283 |
| 4,060,052 | 11/1977 | Algeri et al. | 118/324 |
| 4,135,620 | 1/1979 | Harcuba et al. | 198/836 |
| 4,158,071 | 6/1979 | Jordan et al. | 427/33 |
| 4,289,278 | 9/1981 | Itoh | 239/706 |
| 4,291,640 | 9/1981 | Payne et al. | 118/318 |
| 4,399,945 | 8/1983 | Ruud | 239/697 |
| 4,401,275 | 8/1983 | Ruud | 239/704 |
| 4,600,603 | 7/1986 | Mulder | 427/180 |

FOREIGN PATENT DOCUMENTS

| | | | |
|---|---|---|---|
| 141871 | 1/1935 | Austria | 118/322 |
| 345166 | 9/1978 | Austria . | |
| 2247399 | 9/1975 | France . | |
| 46-32352 | 9/1971 | Japan | 118/324 |

*Primary Examiner*—James C. Housel
*Attorney, Agent, or Firm*—Antonelli, Terry, Stout & Kraus

[57] ABSTRACT

An apparatus for applying a coating of solid particulate powder to the interior surface of tubular, cylindrical articles includes a conveyor for transporting the articles to and from a powder spray station whereat powder is sprayed into one open end of the articles. The conveyor includes an endless belt conveyor movable in a direction perpendicular to the spray from the nozzle and the axes of articles supported on the conveyor. The articles are supported on the conveyor by lugs in the form of rollers which support the articles in grooves defined between adjacent pairs of lugs.

9 Claims, 5 Drawing Sheets

APPARATUS FOR CONVEYING AND COATING CYLINDRICAL ARTICLES

REFERENCE TO RELATED APPLICATION

This application is a continuation-in-part application of the earlier, copending U.S. patent application Ser. No. 07/308,330 filed Feb. 9, 1989 and now abandoned.

TECHNICAL FIELD

The present invention is directed to a method for preventing articles from becoming misaligned as they are conveyed on a band-type conveyor and subjected to an acceleration along the conveyance path, in which method the articles are squeezed between the band-type conveyor and a squeezing arrangement at least at a location along the conveyance path.

BACKGROUND AND SUMMARY OF INVENTION

The invention departs from the problem that when articles are conveyed on a band-type conveyor and these articles are subjected to an acceleration, be it by acceleration of the band conveyor itself or by an acceleration imparted on the articles on the band-type conveyor by an additional drive, e.g. by imparting to the articles a spinning acceleration around a rotational axis, that then the articles will become misaligned on the band-type conveyor, e.g. due to reacting forces of inertia. By using such band-type conveyors to convey the articles, e.g. in a working or treating unit, it is often of high importance to have each of the articles arriving at such a station in an exactly predetermined position and positional relationship with respect to the next following article.

From U.S. Pat. No. 3,310,431 there is known a method to convey electrical components of cylindrical form with laterally extending wire tips on a band-type conveyor, particularly a chain conveyor wherein the wire tips are held in U-shaped bearings laterally arranged on the conveyor. The U-shaped bearings permit a spinning movement of the components around their axis during their conveyance. Before the components are fed to a coating station, their laterally extending wires are squeezed between two laterally spaced endless bands, laterally distant from the U-shaped bearings, and accordingly positioned stationary support surfaces. Thus, a spinning action is imposed on the electric components which arrive, spinning around their axis, at the coating station. This known method is disadvantageous in that a component, as an article to be conveyed, is squeezed laterally distant from the surface defined by the band-type conveyor, so that two equivalent squeezing arrangements must be provided on both sides of the band-type conveyor.

An object of the present invention is to provide a method of the above mentioned type which avoids the said disadvantage of the prior art method, and to provide apparatus for performing the method where the apparatus has a significantly simplified construction for realization of the method.

This object is accomplished by the method of the invention for preventing articles from becoming misaligned as conveyed in a band-type conveyor and subjected to an acceleration along the conveyance path, the method comprising squeezing the articles between the band-type conveyor and a squeezing arrangement at least at a location along the path, opposite the band-type conveyor and within an area defined by the width of the band-type conveyor. If there is a need, when conveying cylindrical articles, to impart to the articles a rotational spin during their conveyance on the band-type conveyor, it is proposed to perform the inventive method by rotatably supporting the articles for rotation around their axis, at predetermined positions on the bank-type conveyor and operating the squeezing means and the band-type conveyor with a speed difference so as to subject the articles to spinning around their axis.

Instead of separately providing a drive arrangement for subjecting the articles to a spinning drive, as e.g. known from the Japanese publication no. 46-32352, the inventively arranged squeezing means are simultaneously used to in fact provide for the spinning drive for the articles. As a preferred realization of the inventive method, the squeezing means are applied by an endless belt opposite the band-type conveyor and within the area defined by the width of the band-type conveyor, i.e. an endless band is used as the squeezing means, so that the articles conveyed on the band-type conveyor may be squeezed and, if needed, driven to spin around their axis by the endless band opposite to the band-type conveyor. Preferably, the speed of the band-type conveyor and the speed of the endless band acting as the squeezing and spinning means, are independently controlled, so that the speed of article conveyance and the speed of article spinning may be selected independently from each other.

The present invention is further directed to a band conveyor arrangement which, comprises a band-type conveyor with bearing surfaces at predetermined positions for cylindrical articles to be conveyed and with a squeezing arrangement adjacent the band-type conveyor to squeeze the articles toward the band-type conveyor, so as to prevent the articles from leaving the bearing on an acceleration. To overcome the aforementioned disadvantage of the known conveyor arrangement of U.S. Pat. No. 3,310,431 in the band-type conveyor arrangement is improved according to the invention the squeezing means of the conveyor arrangement are arranged opposite the width-extent of the band-type conveyor, so as to directly squeeze the articles towards the band-type conveyor.

The present invention is further directed to a method for applying a coating to at least one surface of cylindrical articles, which method comprises conveying said articles in a predetermined sequence on a band-type conveyor to a coating station, and squeezing said articles between a squeezing arrangement and said bearing surfaces on said band-type conveyor. Such a method is again known from the U.S. Pat. No. 3,310,431, according to which the electrical components are laterally squeezed and conveyed through a coating station at which these components are outside coated.

From the U.S. Pat. No. 3,521,598, a method for inside coating rapidly spinning can bodies is known, according to which the cans are conveyed on an indexing wheel where they are held in semi-tubular indexing bearing surfaces. During the coating operation which occurs as the articles, namely the tubular bodies, are on the indexing wheel, the indexing wheel is stopped and a friction wheel frictionally contacts the tubular body to drive it for spinning. Such a method necessitates not only an exact positioning of respective tubular bodies for inside coating, but especially an exact positioning of the friction wheel, so that said wheel will exactly contact the respective tubular body at a predetermined area of its periphery at exactly the coating position for such a body. Moreover, the time span during which the indexing wheel must stop, is not only determined by the time span of spray coating, but also by the time span necessitated to move the friction wheel in frictional contact with the tubular body, to accelerate the tubular body to the desired spinning speed and then for retraction of the frictional wheel.

By the Japanese patent publication no. 46-32352 there is known a method for outside or inside spraying of tubular bodies on a band-type conveyor, in which a spinning action is imparted to the tubular articles by means of a driving frictional cones contacting the tubular bodies at their outside. The tubular bodies are not squeezed on the band-type conveyor, but reside rather on roller-like bearing surfaces which are driven, so that the amount of acceleration, be it spinning acceleration or linear band conveyor acceleration, is limited.

The present inventive method for applying a coating departs from the known method according to the U.S. Pat. No. 3,310,431 which has the disadvantages of lateral squeezing and additionally, from the standpoint of component spinning, coating, squeezing and driving the electrical components for spinning action is done on the outside of the components. The disadvantage of squeezing and coating on the same side is overcome by the improved method of the invention by spray coating at least the interior surfaces of the articles, being tubular articles, at the coating station, and squeezing the articles at least during their coating by applying the squeezing arrangement opposite and within an area defined by the width of the band-type conveyor at the outside of the articles. Spinning of the articles around their axis is provided by installing a speed difference between the squeezing arrangement and the band-type conveyor, at least at the coating station. In other words, the invention recognizes that the known method for outside coating is well suited especially for interior surface coating of tubular articles by separation of a surface, at which squeezing and possibly spinning actions occur, from a surface to be coated.

Spray coating techniques for interior surfaces of tubular articles are known e.g. from U.S. Pat. Nos. 4,15,8071; 4,291,640; 4,399,945; and 4,060,052, the disclosures of which are hereby incorporated by reference.

A band-type conveyor for inventive central squeezing according to the invention comprises a band-type conveyor with bearing surfaces at predetermined positions for cylindrical articles to be conveyed, and a squeezing arrangement adjacent the band-type conveyor to squeeze the articles toward the band-type conveyor, so as to prevent the articles from leaving the bearing surfaces on an acceleration, wherein the squeezing means are arranged opposite the width-extent of the band-type conveyor, so as to directly squeeze the articles toward the band-type conveyor.

Further, an apparatus of the invention for applying a coating to at least one surface of cylindrical articles, which apparatus overcomes the disadvantages of an apparatus for coating such articles according to U.S. Pat. No. 3,310,431 with respect to obstructing coating by the squeezing means acting on the same side of the articles, comprises a band-type conveyor with bearing surfaces for rotatably supporting the articles at predetermined positions on the band-type conveyor, a squeezing arrangement adjacent to the band-type conveyor for squeezing the articles between the band-type conveyor and the squeezing arrangement, a coating station comprising at least one spray nozzle, substantially aligned with a position of the axis of the cylindrical articles on the bearing surfaces at the coating station, so as to spray coating material into an interior space of the tubular cylindrical articles, and wherein the squeezing means is arranged at least in the coating station opposite the extent in width of the band-type conveyor.

To apply a coating apparatus as disclosed e.g. in the U.S. Pat. No. 4,158,071 to high-speed production wherein tube-like articles, such as can bodies, have to be coated rapidly in order that the coating process is not the slowest stage in a chain of production stages for such articles, one important problem to be solved is how to rapidly convey the articles to and from the coating station and possibly how to rapidly accelerate these articles to spinning around their axis.

Another important problem to be solved is how to make the line adjustable, so as not to limit a line to a single size of articles. All carousel conveying techniques wherein such articles are first fed to a carousel, then coated thereon, then again removed, as e.g. known from the U.S. Pat. No. 3,521,598, are relatively slow, because beyond other facts, the articles first must be loaded and after coating removed from the carousel.

Further objects and advantages of the present invention will become clear from the following description of preferred embodiments of the present invention.

BEST MODE FOR CARRYING OUT THE INVENTION

Figure 1:
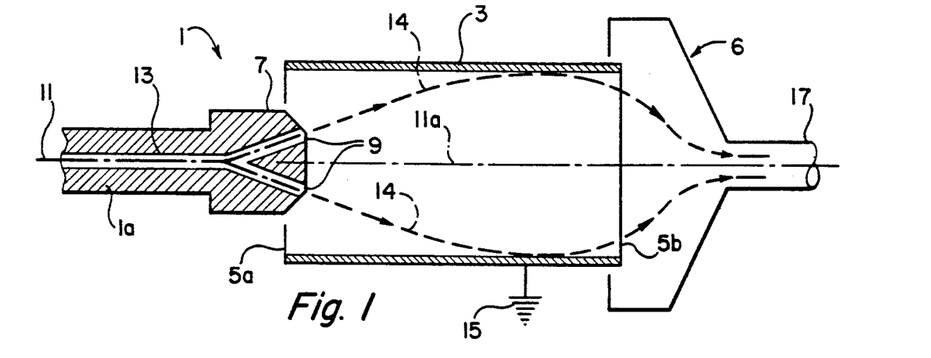
FIG. 1 is a schematic diagram of a powder spray nozzle and powder recovery shroud arrangement for applying powder to the interior surface of a cylindrical, tubular object in accordance with one aspect of the invention and according to one mode of realization.

With reference first to FIG. 1, there is illustrated schematically a powder spray nozzle assembly 1 operative to spray air-entrained powder into a tubular, cylindrical target article 3. The target article in this instance has two open ends 5a and 5b, the end 5b remote from the nozzle 1 being surrounded by a collection shroud 6. Gas-conveyed powder, preferably air-entrained powder, is blown through a nozzle support arm 1a and through a nozzle 7 via nozzle discharge openings or ports 9. The nozzle openings 9 are symmetrically arranged around the axis 11 of the air-entrained powder supply line 13 within the nozzle support arm 1a. A jet of air-entrained powder is ejected from the nozzle ports 9, which jet is rotationally symmetrical with respect to the axis 11. The target article, in this case a tubular cylinder such as the body of a three-piece can, is positioned coaxially to the axis 11 of the nozzle such that the jet of air-entrained powder is directed onto the interior surface of the article 3. As explained more fully hereinafter, the powder of the powder jet 14 is electrostatically charged prior to arrival of the powder at the nozzle. In order to attract and attach the powder to the interior surface of the tubular, cylindrical target, the target substrate is grounded as indicated by the numeral 15.

Surrounding and covering the opening 5b of the tubular, cylindrical article 3 at the end opposite from the nozzle 1 there is a powder recovery shroud 6. This shroud is connected to a vacuum source via a tube 17 such that a vacuum is applied to the inside of the shroud and thus, to a limited extent, the inside of the article 3. This shroud is operative to suction off excess powder which does not adhere to the inside surface of the article 3. Typically, this excess powder is led by means of the tube 17 to a powder recovery unit for re-use of the excess powder.

When coating tubular articles having two open ends, powder spray may be directed through one of the open ends and excess powder recovered at the other, as shown in FIG. 1. But, this technique is not possible when coating tubular articles which have only one open end, as for example, the bodies of two-piece cans.

Figure 2:
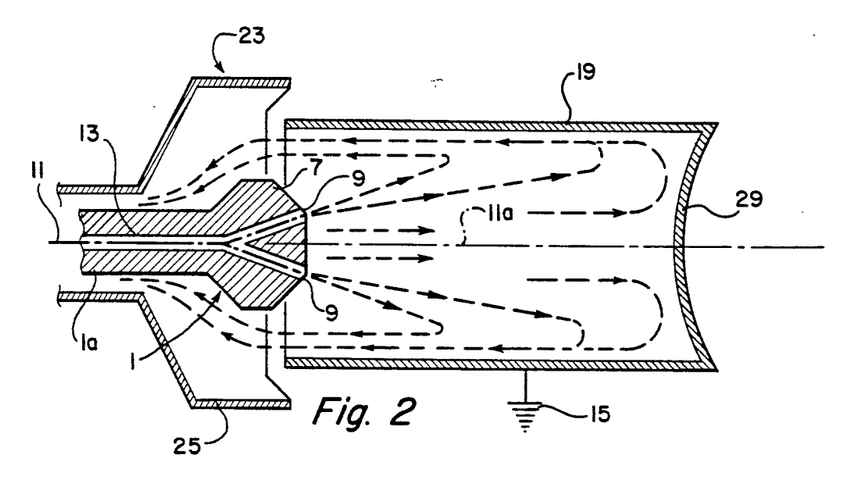
FIG. 2 is a partially diagrammatic cross-sectional view of a powder spray nozzle and powder recovery shroud arrangement for spraying the interior of a closed-end, tubular, cylindrical object in accordance with one aspect of the invention of this application, according to a second mode of realization.

In FIG. 2 there is schematically illustrated the technique for spraying tubular articles which have only one open end. As there illustrated, gas-entrained powder which has been electrostatically charged is supplied through a powder supply line 13 to the nozzle openings 9 of nozzle 7. Around the nozzle 7 there is provided a vacuum or powder recovery shroud 23, which shroud is coaxially aligned with respect to the axis 11 of the nozzle 7. During the coating of the closed-end article 19, the article is coaxially aligned with the axis 11 of the nozzle and vacuum shroud 23. Preferably, the outer peripheral wall 25 of the shroud 23 is also cylindrical in configuration and slightly exceeds the diameter of the tubular, cylindrical article 19.

Electrostatically charged powder, which powder is electrostatically charged upstream of the nozzle by either friction or by a corona electrode, is sprayed from the nozzle 7 and generally follows the path indicated by the dashed lines of FIG. 2. As illustrated in these dashed lines, the injected air-entrained powder fills the interior of the article 19 and flows radially outwardly towards the walls of the article and then back along the walls into the shroud. Due to the electrostatic charge on the powder particles, a substantial portion of the sprayed powder adheres to the interior wall of the article 19 so that only excess powder and conveying air is removed by the vacuum shroud 23 and fed back to a powder recovery unit. By adjusting the pressure of the powder conveying airstream and the pressure of the vacuum contained in the powder recovery shroud 23, an optimal coating of powder is obtained on the sidewalls as well as the bottom wall 29, of the article 19.

Figure 3:
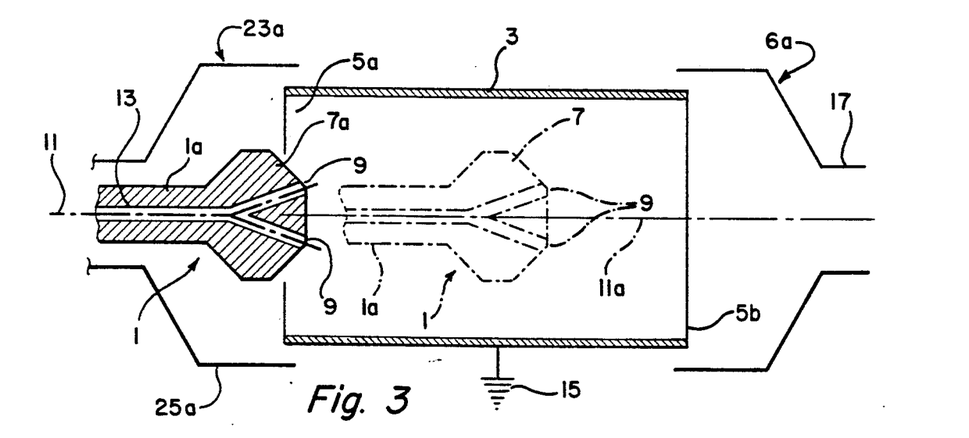
FIG. 3 is a partially diagrammatic illustration of a spray nozzle powder recovery shroud arrangement for spraying the interior surface of a tubular, cylindrical object in accordance with one aspect of the invention of this application, according to a third mode of realization.

In FIG. 3 there is illustrated another coating technique for coating the interior surface of cylindrical, tubular articles 3 which have two open ends 5a, 5b. According to this technique, a nozzle assembly 1a and collection shroud 6a at the end opposite from the nozzle assembly 1a are provided. This nozzle assembly 1a and powder collection shroud 6a are identical to the nozzle assembly and shroud 6 of FIG. 1. Additionally, though, in the practice of the technique employed in FIG. 3, an additional shroud 23a is provided at the open end adjacent to which the nozzle assembly 1a is located. Thus, according to the technique illustrated in FIG. 3, a single nozzle assembly 1a is utilized to spray electrostatically charged powder onto the interior surface of the tubular, cylindrical article 3 while oversprayed powder is collected from both open ends 5a, 5b of the body 3.

In the practice of the coating technique illustrated in FIGS. 1 to 3 the nozzle assembly 1 or 1a may be reciprocated into and then back out of the can body 3 or 19 while electrostatically charged powder is dispensed from the discharge orifices 9 of the nozzles. The necessity for reciprocation of the nozzle assembly is, of course, a function of the axial length of the tubular object 3 or 19 into which the powder is being sprayed.

Figures 7, 7A:
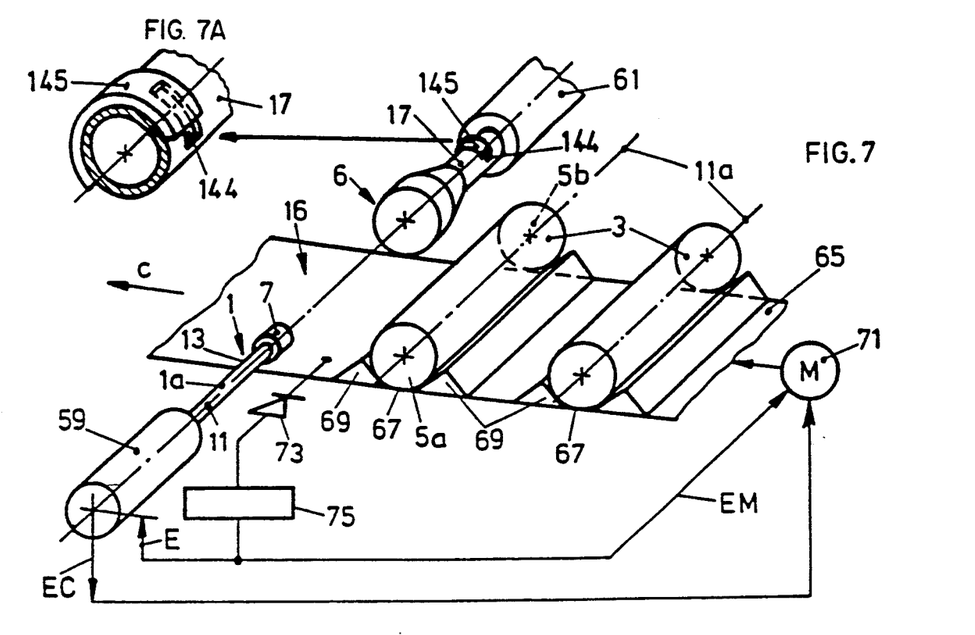
FIG. 7 is a schematic illustration of the inventive conveyor arrangement of the invention of this application, under said one aspect.
FIG. 7A is an enlarged view of the encircled portion of FIG. 7.
Figure 8:
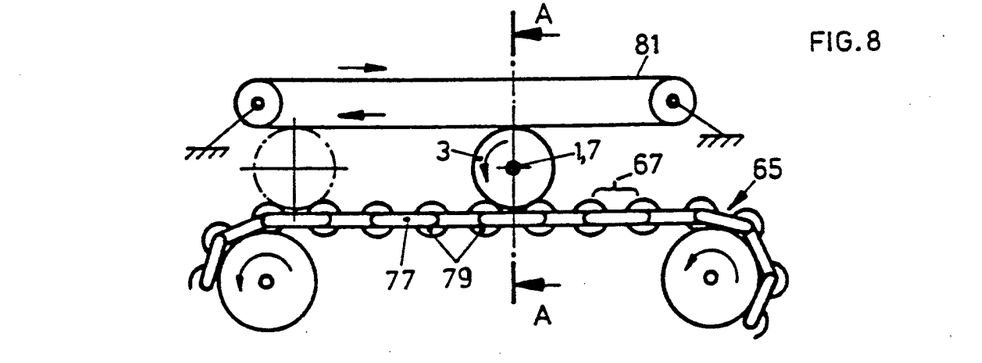
FIG. 8 is a schematic illustration of a preferred construction of the conveyor of FIG. 7.

With reference now to FIGS. 7 and 8 there is illustrated a portion of a coating system according to the present invention for applying powder to the interior of cylindrical bodies 3 in accordance with the technique illustrated and described in FIG. 1. This system includes a powder stream generator unit 59 for generating a powder pulse or powder stream whenever a body 3 is axially aligned with the nozzle 7 of the generator 59. Whenever a body 3 is not aligned with the nozzle 7, the powder flow is interrupted so as to avoid oversprayed powder while bodies are moved into and out of alignment with the nozzle 7. The powder stream generator unit 59 receives an enabling control input signal E effective to initiate the spraying of a stream of powder from the generator and generates at the end of a predetermined spray cycle an end of coating signal EC.

The system illustrated in FIG. 7 includes a vacuum hood 6 for recovering excess powder. As explained more fully hereinafter, this hood 6 is connected to a powder recovery unit 61. While the system illustrated in FIG. 7 corresponds and practices the technique of spraying illustrated in FIG. 1, the system could as well be used to practice the techniques illustrated and described with reference to FIGS. 2 and 3 hereinabove in which event an additional powder recovery shroud could be added to the system at the spray nozzle end of the article.

The powder coating unit illustrated in FIG. 7 is operative to spray articles 3 when those articles are located at a spray station 16, which station is colinearly aligned with the axis of the nozzle 7 and powder recovery shroud 6. Articles 3 are conveyed to the powder spray station on an endless belt-type conveyor 65. This conveyor 65 transports articles 3 in a direction perpendicular to the axis 11 of the nozzle and powder recovery hood 6. The band-type conveyor may be a chain conveyor or a band conveyor.

On the endless belt-type conveyor 65 there are article receiving bearing-grooves 67 formed between positioning lugs 69. The articles 3 rest atop and between a pair of these lugs 69 with the axes 11a of the tubular, cylindrical articles 3 arranged perpendicular to the direction of movement of the conveyor 65 and parallel to the axis 11 of the nozzle and powder recovery hood 6. The nozzle 7 and powder recovery shroud 6 are located above the plane of the endless belt-type conveyor 65 so that the distance of the axis from the plane of the conveyor 65 is exactly the same distance as the distance the axes 11a of the tubular articles 3 are spaced from the top surface of the conveyor 65. As a consequence of this relative location of the axes 11 and 11a of the nozzle and cylindrical articles, respectively, the axes 11a of the articles are coaxially aligned with the axis 11 of the nozzle and hood when the articles 3 are located in the spray station 16. To move the articles into and out of the spray station, the conveyor 65 is driven in the direction C by a drive motor 71.

A detector 73, as for example, a photoelectric signal generator, is provided in alignment with the lugs 69 of the conveyor 65. Every time a lug 69 passes the detector 73, such passing is detected, and there is generated a signal indicative of the presence of an article 3 in coaxial alignment with the nozzle 7 and recovery shroud 6, respectively.

A control unit 75 is operatively connected to the signal generator 73. This control unit 75 is operative to give rise to the signal E which initiates operation of the powder spray unit 59 and a signal EM which terminates indexing movement of the conveyor 65.

After an article 3 has been spray coated, the generating unit 59 generates an output signal EC to the motor 71 operative to cause that motor to index the conveyor 65 and terminate the flow of powder from the signal generator 59. Thus, there is provided in general terms an exact synchronization between the powder coating generator 59 and the drive motor 71 for the endless belt conveyor 65. The indexing action of the conveyor 65 results in high accelerations of the articles 3.

Instead of providing only one powder stream generator 59 and recovery shroud 6, as shown in FIG. 7, two such units may be provided adjacent one another with a distance between them equal to the distance between two or more articles 3 on the conveyor 65. If two or more coating stations are provided along the conveyor 65, two or more articles 3 may be simultaneously coated at the coating stations. Or, alternatively, one end of one article 3 may be coated at one coating station and the opposite end coated at another station.

Figure 9:
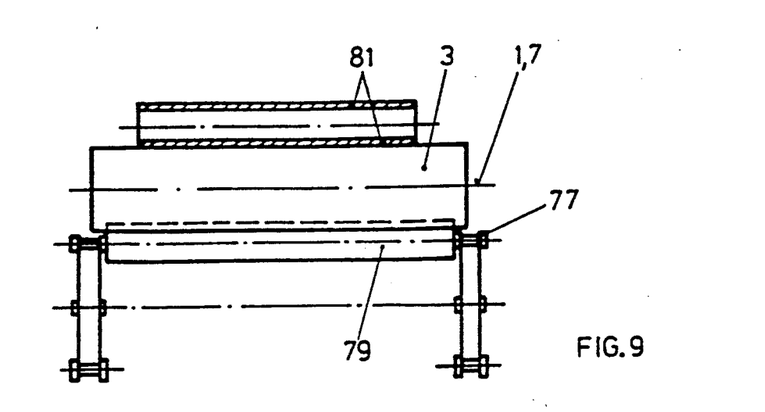
FIG. 9 is a schematic illustration of the section according to line A—A through the conveyor of FIG. 8.

With reference now to FIGS. 8 and 9, there is schematically illustrated the conveyor 65 of FIG. 7. The endless belt conveyor 65 comprises a pair of parallel, endless chains 77 drivingly connected to a drive shaft D. The receiving grooves 67 for the articles 3 are formed between rollers 79 which are rotatably connected between the chains 77. Provision of the rollers 79 functioning as lugs 69 has the advantage that, as shown in dashed lines to the left-hand side of FIG. 8, tubular articles 3 of different diameter may be received on such rollers 79 without the need to change the spacing between the rollers. When there is a change in the diameter of articles 3, only the distance of the powder stream generator 59 and powder recovery shroud 6 need be varied or moved relative to the plane of the endless belt conveyor 65. No adjustment is needed for the detector 73.

The articles 3 are each rotated or spun around their axis while powder is sprayed into the interior of the article. To effect this spinning and to firmly hold the articles on the rollers 79 even at high indexing and spinning accelerations, there is provided a squeezing and driving endless belt 81, which endless belt has a lower run which extends parallel to the upper run of the can supporting conveyor 65 and disposed over the extent in width of the conveyor 65. The distance between the two parallel runs of the belt conveyors 81 and 65 may be adjusted so that articles 3 of different diameters may be supported between the belts and driven in rotation by the upper drive and squeezing belt 81. By selecting the speed difference of conveyor 65 and belt 81, the spinning speed is accordingly selected.

The inventive conveyor of FIGS. 8, 9 may also be used for other conveyance purposes where high accelerations could lead to misalignment or displacement of articles conveyed in predetermined positions on the conveyor 65. By independent drives for the squeezing and spin-driving belt 81 and for the conveyor 65 a conveyance speed and spinning speed may be adjusted. Further, by synchronization or timely dependent control of the said two drives spinning may be generated at predetermined locations of conveying path only, for one, two or more articles simultaneously.

Figure 4:
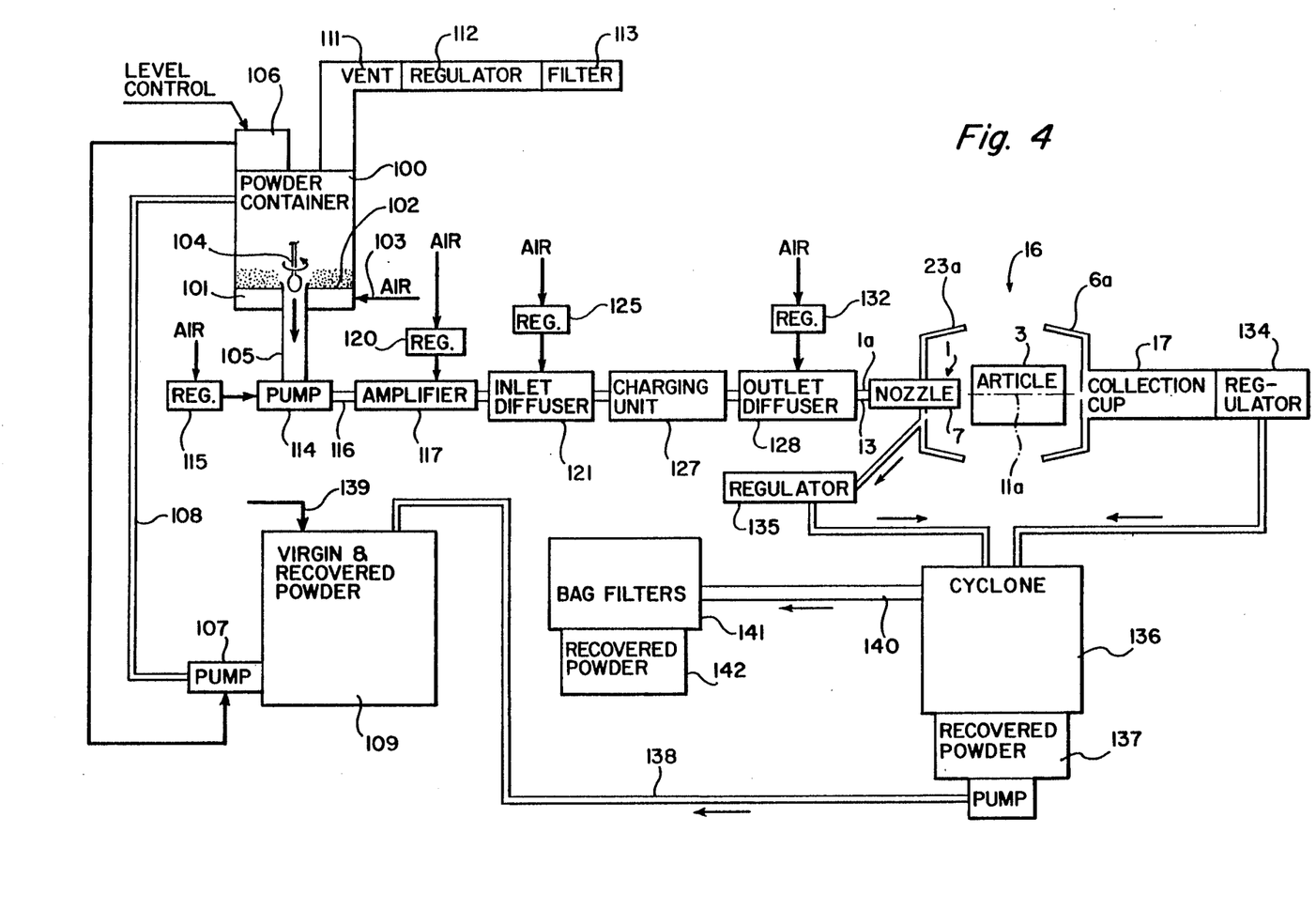
FIG. 4 is a diagrammatic illustration of a complete system for interiorly coating tubular, cylindrical articles in accordance with the one aspect of the invention of this application.
Figure 5:
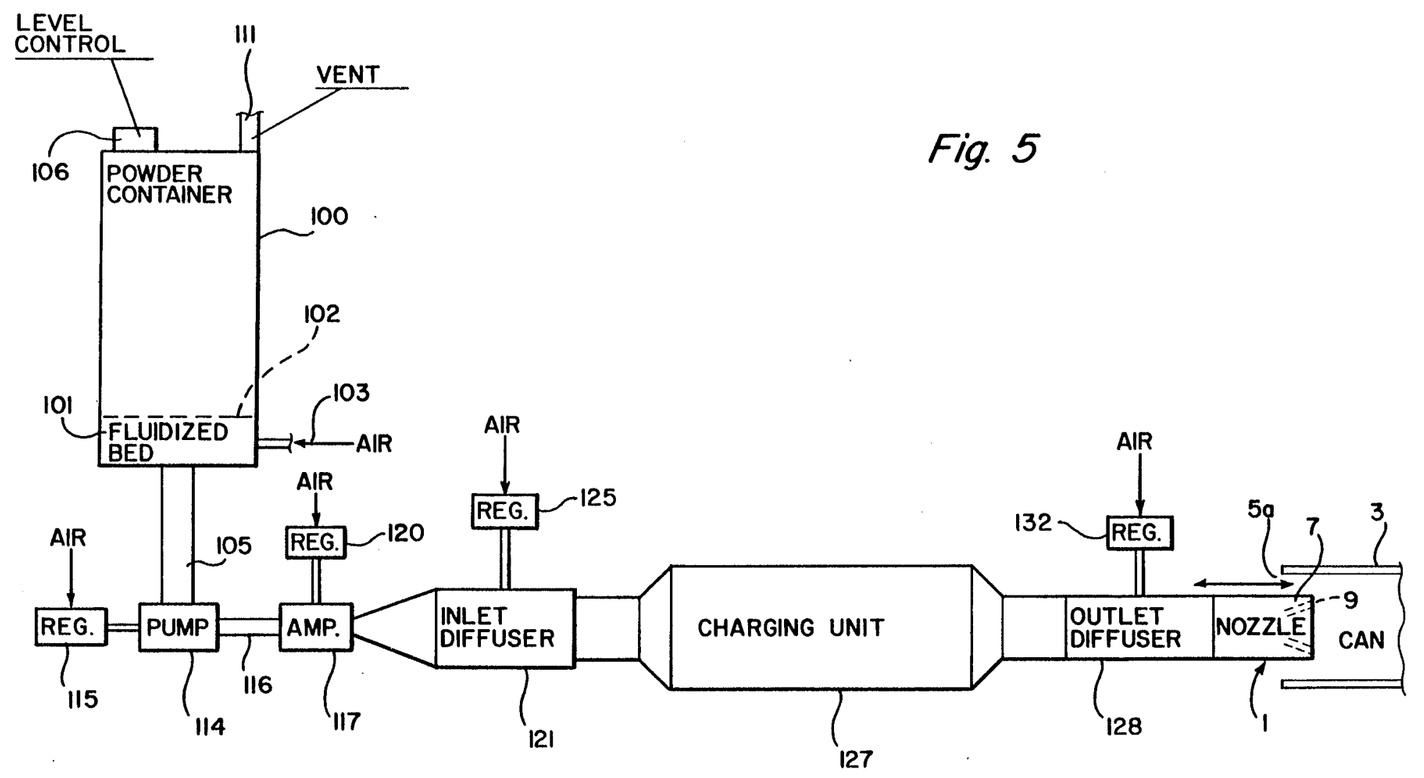
FIG. 5 is a side elevational view of a portion of the powder spray system of FIG. 4.
Figure 6:
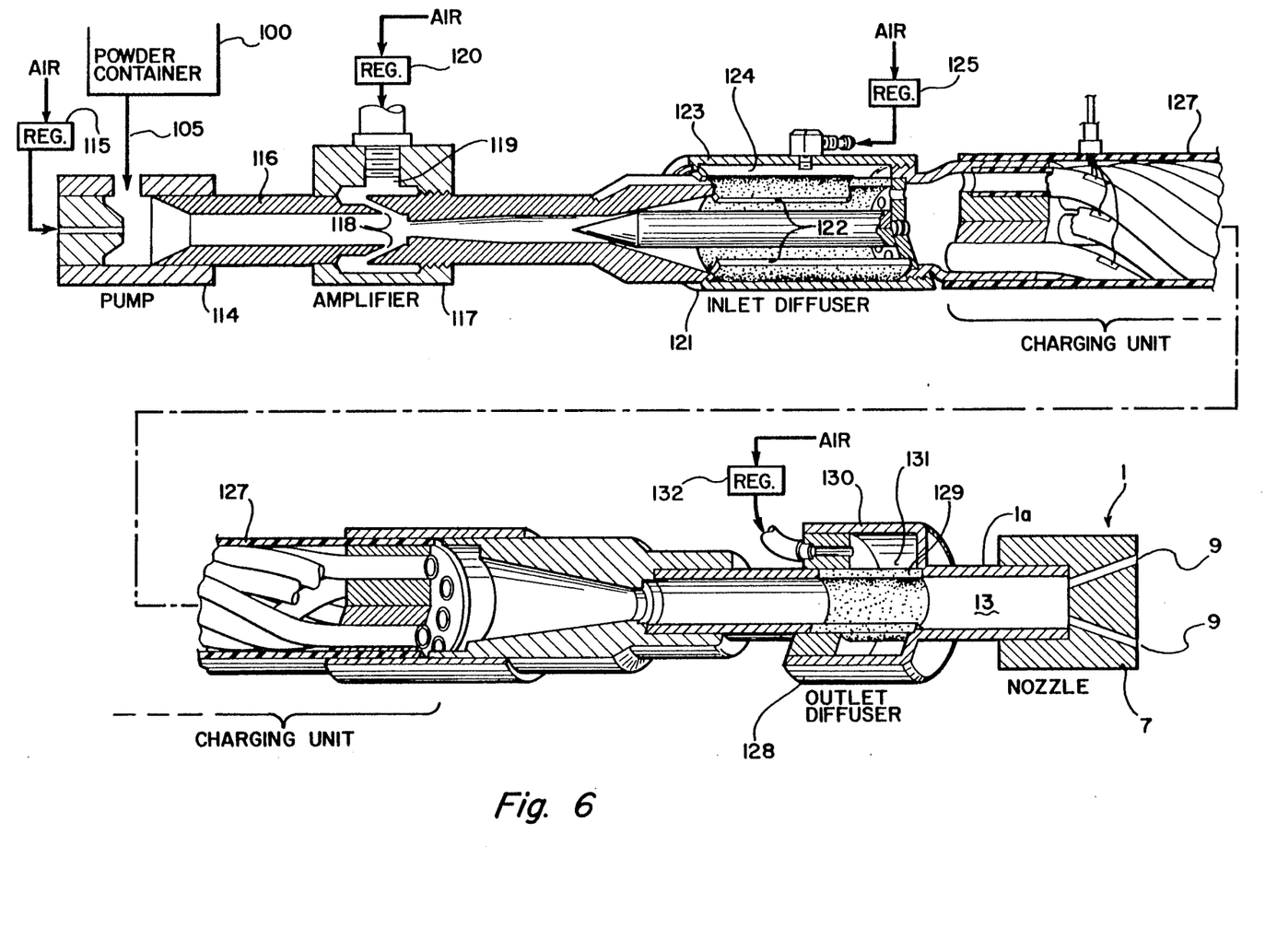
FIG. 6 is a cross-sectional view through the portion of the powder spray system illustrated in FIG. 5.

With reference now to FIGS. 4 to 6 there is illustrated a complete system for interiorly powder coating tubular, cylindrical articles. This system comprises a fluidizing bed powder container or hopper 100 which is constructed in the manner disclosed in EP-A-0 268 126. This container comprises a bottom fluidizing bed plate 102 of porous material.

Fluidizing air 103 into the chamber 101 of the container 100 is directed upwardly from the air chamber 101 through the fluidizing bed bottom plate 102 so as to fluidize powder residing atop the plate 102. A mechanical agitator 104 in the form of a rotating beater is located internally of the container 100 adjacent the inlet end of an outlet conduit 105. This outlet conduit 105 extends through the bottom wall of the fluidizing bed and has an upper edge which projects above the top surface of the bottom porous plate 102.

A conventional level control sensor 106 is mounted atop the fluidizing bed hopper 100 and is operative to detect the fluid level within the container 100 and control a pump 107 to maintain a predetermined level of powder in the fluidizing bed container or hopper 100. The level control 106 is operative when the level of powder in the hopper falls below a predetermined level to actuate the pump 107 and cause it to pump powder along a line 108 from a powder container 109 to container 100. The powder container 109 contains both virgin or new powder, as well as oversprayed powder which has been collected and returned to the container 109. The air pressure within the fluidizing bed hopper 100 is maintained substantially constant by means of a vent 111, a pressure regulator 112, and a filtered outlet 113 through which air from the fluidizing bed container 100 is vented to atmosphere. Powder exiting from the fluidizing bed hopper 100 through the outlet conduit 105 enters a Venturi pump 114. This pump is a conventional Venturi-type pump and may be constructed as illustrated and described in the above-identified EP-A-0 268 126.

In accordance with the practice of the invention of this application, air pressure from a source of air pressure through a regulator 115 is pulsed or supplied intermittently to the pump 114 so as to cause powder to be suctioned from the conduit 105 out of the fluidizing bed hopper 100 and propelled through a pipe 116. To further accelerate the air-entrained powder from the pump 114, there is provided downstream of the pump an air amplifier 117. This amplifier is operative to inject air into the powder supply line so as to increase the amount of powder entrainment air and energy input to that entrainment air.

With reference to FIG. 6, it will be seen that the amplifier 117 comprises a plurality of evenly distributed ports 118 located around the interior surface of the amplifier. Each of these ports is inclined in the direction in which the air-entrained powder is projected along the powder supply line 13 and is connected to an air inlet passage 119. Air to passage 119 and hence to these inclined passages 118 is supplied from a source of air pressure through an adjustable pressure regulator 120 such that the air pressure in the powder supply line may be regulated and closely controlled. The air pressure supplied to the amplifier 117 is pulsed or turned on and off in synchronization with the pumping airflow to the powder pump 114.

Downstream of the air amplifier 117 the air-entrained powder stream passes through an inlet diffuser 121. This diffuser includes a porous cylinder 122 contained internally of a surrounding non-porous cylinder 123, there being an air chamber 124 between the two cylinders. Air to this chamber 124 is supplied from an air pressure source through a pressure regulator 125. The porous cylinder of the inlet diffuser may take the form of a sintered metal cylinder. Thus, an evenly distributed current of air is directed radially into the powder flow line from the regulator 125 through the porous cylinder 122 of the diffuser 121.

Downstream of the inlet diffuser 121 there is a triboelectric charging unit 127. This unit 127 functions to electrostatically charge the air-entrained powder contained in the powder supply line. The triboelectric charging unit is a conventional charging unit within which the air-entrained powder is directed into multiple spiral tubes contained internally of a casing. In the course of passage through these spiral tubes, the powder fractionally contacts the walls of the tubes and picks up an electrostatic charge therefrom. A complete description of this type of electrostatic charging unit may be found in U.S. Pat. No. 4,399,945.

Instead of a tribocharging unit 127, a conventional corona-discharge electrode arrangement may be used in the powder supply line of this application. Such a charging unit, though, must be located upstream of the nozzle 7, and preferably at the location in the powder supply line where at the tribocharging unit 127 is located, such that the powder is electrostatically charged before it enters the nozzle.

After emerging from the spirally wound conduits of the tribocharging unit 127, the air-entrained powder enters a second or so-called outlet diffuser 128. This outlet diffuser 128 is constructed similarly to the inlet diffuser. That is, it comprises an inner porous cylinder 129 encased within a solid cylinder 130 and between which there is an air chamber 131. Inlet air is supplied to this air chamber 131 from an air supply source through a pressure regulator 132. From the internal chamber 131 of the outlet diffuser 128, the air passes radially through the porous cylinder 129 into the powder supply line. This air is maintained as a constant stream of air from the source through the pressure regulator 132, while the air-stream to the pump 114 and amplifier 117 is pulsed or turned on and off in accordance with the alignment of articles 3 with the nozzle 7 of the powder supply line 13.

The powder supply line terminates at the nozzle 7 after flowing from the outlet diffuser 128. This nozzle is equipped with a surrounding powder recovery shroud 23 and is coaxially aligned, but spaced from, the powder recovery shroud 6. The powder recovery shroud 23, as well as the powder recovery shroud 6, are connected via pressure regulators 135 and 134, respectively, to a vacuum source part of a cyclone separator 136. Within the cyclone separator 136 the air is separated from the recovered powder, and the recovered powder is collected in a powder collector 137. From this collector 137 the recovered powder is pumped via line 138 to the tank 109 to be there mixed with virgin powder supplied to the tank 109 via an inlet 139. The air collected by the cyclone separator 136, along with a very small percentage of powder contained therein, is fed via line 140 to a filter unit 141 where the residual powder is collected in a collector 142.

In the use of the system illustrated in FIGS. 4 to 6 the articles 3 are indexed and spun by the conveyor arrangement of FIGS. 7, 8 and 9 into axial alignment with the axis 11 of the nozzle 7 and recovery shroud 6. When so aligned, a pulse of air is supplied through the pressure regulators 115, 120 associated with the powder pump 114 and air amplifier 117 into the pump 114 and amplifier 117. This pulse of air is operative to suck or withdraw powder from the fluidizing bed 100 into the powder pump 114, from whence it is pumped through the amplifier 117, the inlet diffuser 121, to the electrostatic charging unit 127. From the electrostatic charging unit the air-entrained and electrostatically charged powder is pumped through the outlet diffuser 128 to the nozzle 7. From the nozzle 7 the air-entrained powder is ejected as a jet of air-entrained, electrostatically charged powder which is rotationally symmetrical with respect to the axis 11. That is, the air-entrained powder is directed from multiple orifices 9 of the nozzle located in a generally circular pattern so that a rotationally symmetrical fan or pattern of air-entrained powder is directed from the nozzle onto the interior surface of the tubular, cylindrical article 3.

Depending upon the length of the article 3, the nozzle may be lanced or reciprocated internally of the article so as to effect complete coverage of the interior surface of the article for the length of the article. In the event that the nozzle is lanced or reciprocated within the interior of the article 3, then the entire powder supply system, including the hopper 100, pump 114, amplifier 117, inlet diffuser 121, charging unit 127, and outlet diffuser 128, are reciprocated along with the nozzle. Thus, there are no flexible lines or powder supply conduits located in the powder supply line which may bend and function as traps to collect powder and cause erratic flow of powder from the nozzle while air is pulsed or caused to flow to the powder pump 114 and amplifier 117. This lack of flexible conduits in the powder supply line thus contributes to an even or constant flow of powder from the nozzle throughout the powder spray cycle.

A large percentage of the electrostatically charged powder adheres to the interior surface of the article 3.

That powder which does not adhere, though, is withdrawn from the interior surface of the article via the vacuum within the powder recovery shrouds 23 and 6. To ensure that the appropriate vacuum is applied to the shrouds such that the oversprayed powder is all withdrawn through the shroud and caused to pass through the regulators 134, 135 back to the cyclone separator 136, each return line includes the regulators 134, 135. Each of these regulators consists of a slot 144 in the vacuum return line (see FIG. 7A), which slot is covered with an arcuate collar 145. This collar 145 extends for less than the full circumference of the conduit such that by rotating the collar, a greater or lesser extent of the slot 144 may be covered or uncovered. Thereby, the vacuum pressure in the return line may be adjusted so as to be appropriate to withdraw all oversprayed powder, but not so strong as to suck loosely adhered powder from the interior surface of the article.

One of the advantages of the system illustrated and described herein for applying powder to the interior surface of a hollow, cylindrical article is its ability to pulse powder flow to the interior surface of an article when an article is aligned with the discharge nozzle of the system, and then to maintain an even flow of powder from the nozzle during the powder flow or powder-on portion of the pulse cycle. At the conclusion of the pulse, when the airflow to the pump 114 and amplifier 117 is terminated or turned off, the flow of air to the inlet diffuser 121 and outlet diffuser 128 is maintained or remains turned on. This diffuser airflow is operative to purge the powder flow line 13 of the system of all powder such that when the next article is aligned with the nozzle and the air again turned on to the pump 114 and amplifier 117, an even and predictable flow of powder is initiated through the system to the nozzle. In the absence of the diffuser airflow between the nozzle and the pump, the powder contained in the system at the conclusion of a pumping cycle would settle out in the powder flow line and upon the restart of a new cycle, cause a powder puff or unpredictable excess of powder to initially start the powder flow cycle. Thereby the inventive conveyor allows for very high indexing accelerations and simultaneously for spinning the tubular articles without any obstruction of the coating process.

While we have illustrated and described only a limited number of embodiments of the invention of this application, persons skilled in the art to which this invention pertains will appreciate numerous changes and modifications which may be made without departing from the spirit of our invention. Therefore, we do not intend to be limited except by the scope of the following appended claims.

I claim:

1. An endless conveyor arrangement for intermittently conveying tubular bodies comprising:
   a driven conveyor in the form of an endless loop with at least one linear section and comprising a plurality of bearing cylinder-surfaces supported on said conveyor at spaced locations along a length extent of the conveyor with axes of said surfaces disposed in a plane parallel to said conveyor and transverse to the length extent of said conveyor at said linear section, the surfaces of respective pairs of adjacent cylinder-surfaces forming bearing means for supporting one of said tubular bodies substantially independently of the diameter of a cylindric part of said body to be supported on said bearing means;
   means for intermittently driving said conveyor;
   a squeezing arrangement comprising a driven endless belt having a linear section running distant from and parallel to said linear section of said driven conveyor so as to bias said tubular bodies down on said bearing means by contacting a cylindrical part of such bodies, to prevent said bodies from being propelled out of said bearing means due to acceleration of said intermittent conveyance;
   means for adjusting the distance of said linear section of said driven endless belt of said squeezing arrangement with respect to said linear section of said driven conveyor so as to adjust said conveyor arrangement for different diameters of tubular bodies.

2. The endless conveyor arrangement according to claim 1, said bear cylinder-surface are formed by rotatable rollers, and including means for driving said driven endless belt of said squeezing arrangement and said conveyor at different speed relative to each other so as to impart a spinning rotation to said tubular bodies between said bearing means and said linear section of said driven endless belt of said squeezing arrangement.

3. An apparatus for applying a coating to at least one surface of tubular bodies, comprising an endless conveyor arrangement including a driven conveyor in the form of an endless loop with at least one linear section and comprising a plurality of bearing cylinder-surfaces supported on said conveyor at spaced locations along a length extent of the conveyor with axes of said surfaces disposed in a plane parallel to said conveyor and transverse to the length extent of said conveyor at said linear section, the surfaces of respective pairs of adjacent cylinder-surfaces forming bearing means for supporting one of said tubular bodies substantially independently of the diameter of a cylindric part of said body to be supported on said bearing means;
   means for intermittently driving said conveyor;
   a squeezing arrangement comprising a driven endless belt having a linear section running distant from and parallel to said linear section of said driven conveyor so as to bias said tubular bodies down on said bearing means by contacting a cylindrical part of such bodies, to prevent said bodies from being propelled out of said bearing means due to acceleration of said intermittent conveyance;
   means for adjusting the distance of said linear section of said driven endless belt of said squeezing arrangement with respect to said linear section of said driven conveyor so as to adjust said conveyor arrangement for different diameters of tubular bodies;
   a coating station comprising at least one spray nozzle substantially aligned with a position on the axis of a tubular body supported on said bearing means so as to spray coat material into an interior space of said tubular body, and wherein said squeezing arrangement is located at least in said coating station opposite the driven conveyor.

4. The apparatus according to claim 3, further comprising means for controllably driving said endless belt of the squeezing arrangement and said driven conveyor with respect to speed so as to cause a spinning of said tubular bodies around their axes at least at the coating station of said apparatus.

5. The apparatus according to claim 4, wherein said squeezing arrangement and said driven conveyor are independently controllable with respect to their speed in the direction of article conveyance, so as to independently adjust conveying and spinning speeds of the tubular bodies.

6. The apparatus according to claim 4, further comprising a timing unit for timing conveying movement of said driven conveyor and said mutual speed and thus said spinning of said tubular bodies.

7. The apparatus according to claim 3, wherein said bearing surfaces comprise rollers rotatably supported on said driven conveyor, so as to support cylindrical tubular bodies of different diameter without adjustment of said bearing surfaces.

8. The apparatus according to claim 3, further comprising a synchronization unit for synchronizing the conveying speed of said driven conveyor and coating action at said coating station.

9. The apparatus according to claim 3, wherein said coating station further comprises recovering means for overspray coating material.

* * * * *